S. W. PEREGRINE.
GAS GENERATOR FOR EXPLOSIVE ENGINES.
APPLICATION FILED NOV. 5, 1910.
1,072,402.
Patented Sept. 2, 1913.
2 SHEETS—SHEET 1.
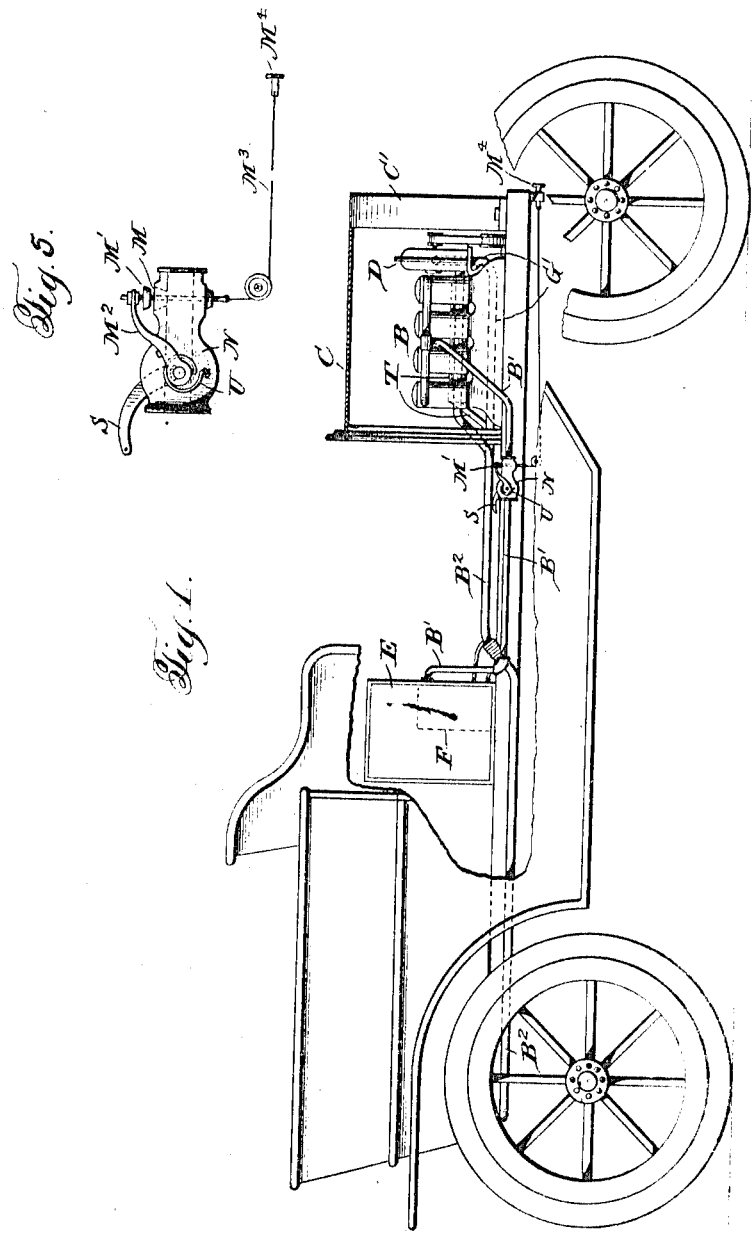

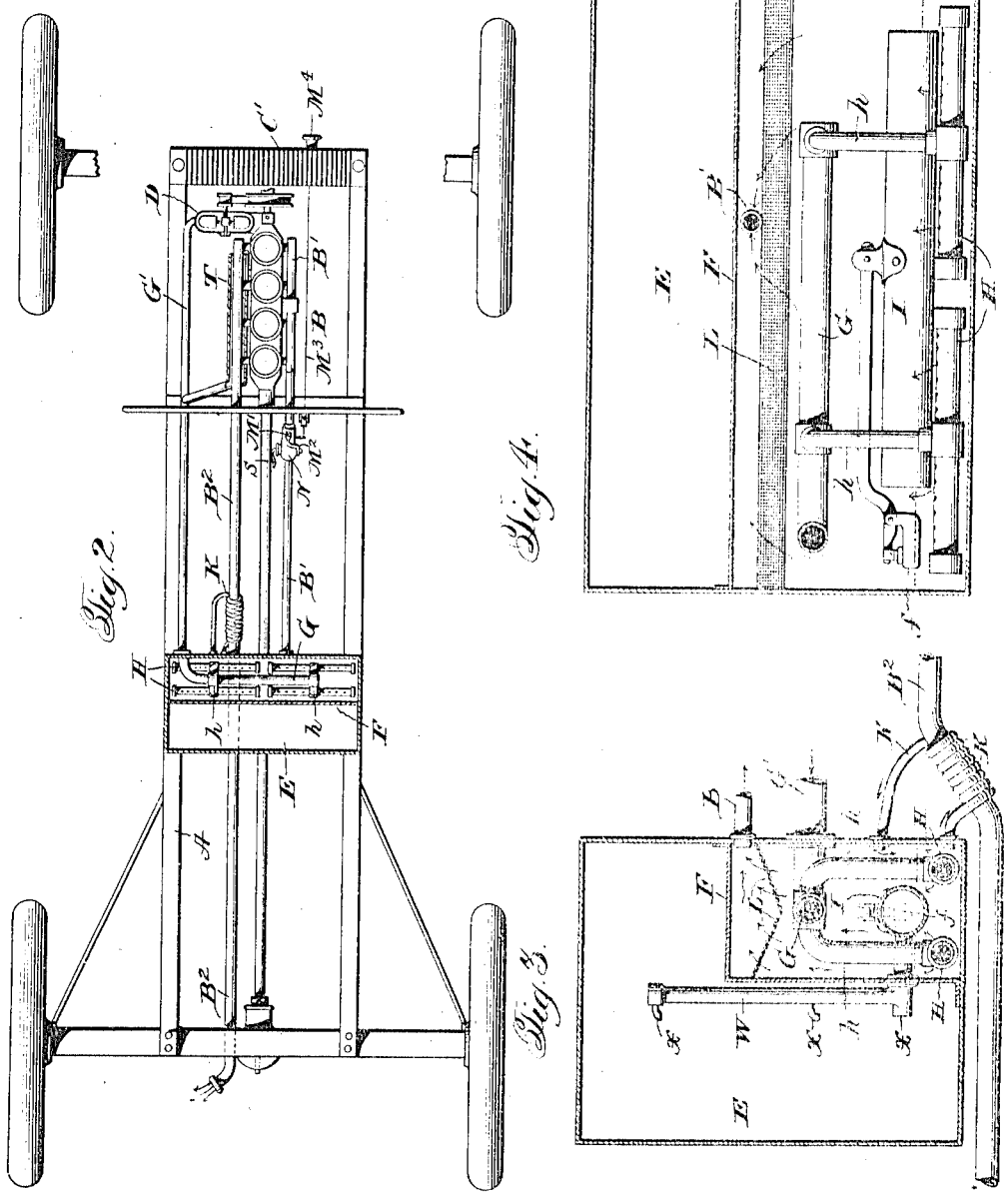

UNITED STATES PATENT OFFICE.

SEYMOUR W. PEREGRINE, OF PORTLAND, MAINE.

GAS-GENERATOR FOR EXPLOSIVE-ENGINES.

1,072,402.

Specification of Letters Patent. Patented Sept. 2, 1913.

Application filed November 5, 1910. Serial No. 590,945.

*To all whom it may concern:*

Be it known that I, SEYMOUR W. PEREGRINE, a citizen of the United States, residing at Portland, in the county of Cumberland and State of Maine, have invented certain new and useful Improvements in Gas-Generators for Explosive-Engines, of which the following is a specification, reference being had therein to the accompanying drawing.

This invention relates to an improvement in gas generators for explosive engines, and more particularly to a gas generator of the type which is especially adapted for use on motor vehicles.

One of the objects of the present invention is the provision of an improved device of this character with which the heavier or cruder types of volatile oils can be used with the same degree of efficiency as the purer or lighter types.

A still further object of the present invention is the provision of a device of this character in which the air which is drawn through the engine radiator and casing and into contact with the engine cylinders and thus heated, is subsequent to its passage through the engine hood or casing, sprayed beneath the surface of an oil to generate the explosive mixture.

A further object of the invention is the provision in a device of this character of means for utilizing the exhausts of the engine to heat the oil which is used to produce the explosive mixture.

A further object of the present invention is the provision of a device of this character which is so constructed that it may be readily applied to any of the present types of motor vehicles.

Other objects of the present invention will be apparent from the detailed description hereinafter when read in connection with the accompanying drawings wherein a convenient embodiment of the invention is illustrated and wherein like characters of reference refer to similar parts in the several views.

In the drawings, Figure 1 is a fragmentary side elevation, parts being shown in section, of a motor vehicle equipped with the present invention. Fig. 2 is a top plan view of a motor vehicle body equipped with the present invention, parts being shown in section, Fig. 3 is a cross section of the carbureter, Fig. 4 is a longitudinal section of the carbureter, Fig. 5 is a side elevation of the gas supply pipe and the gas and air valves therein.

Referring now more particularly to the drawings, A designates the frame of a motor vehicle, which may be of any suitable type, and upon the forward portion of which is supported the engine B, which may be of any well known type. The engine B is provided with the gas supply pipe B', and with the usual exhaust pipe B², which extends to the rear portion of the vehicle. The engine is inclosed by the usual hood C, the front of which is formed by the radiator C'. Positioned within the forward portion of the engine hood C at one side of the engine B is a suction fan D which is provided with an inlet opening in the rear side thereof and with a peripheral outlet opening. The fan D is preferably driven from the engine shaft and serves when actuated to draw air through the radiator in the front of the hood and between the cylinders of the engine, so that when the air passes into the fan it will have been highly heated by reason of its contact with the radiator and cylinders of the engine.

Positioned beneath the seat of the motor vehicle or in any other convenient location, is a large oil storage tank E, one portion of which is partitioned off to form a smaller compartment F, which forms the casing for the carbureter, or said carbureter may be separate and placed near the engine. Positioned within the carbureter is an air feed pipe G which extends longitudinally of the carbureter and one end of which is connected by the pipe G' to the peripheral outlet of the fan D heretofore referred to. Lying in the lower portion of the carbureter F are a plurality of spray pipes H, the ends of which are closed and the upper portions of which are provided with a plurality of small openings therein. Each of the spray pipes H is connected with the air feed pipe G by a branch pipe $h$. The carbureter F communicates with the storage tank through a valved port $f$, and inlets X in the pipe W, and the valve controlling such port is controlled by means of a float I which is positioned within the carbureter, so as not to affect its working when the vehicle is ascending or descending an incline, and which serves to always maintain a fixed and constant level of oil in the carbureter, such level being considerably above the spray pipes H heretofore referred to.

From the construction heretofore described, it will be seen that the hot air which is drawn from the engine casing and along the exhaust pipe is sprayed below the surface of the oil in the carbureter, and it has been found that by the use of such heated air, a very low grade of gasolene or oil can be gasified. To further heat the air, I show a casing T around the exhaust pipe $B^2$, the rear end of which communicates with the outlet pipe leading from the fan D. Through this casing the air will be drawn in contact with the exhaust pipe and through the carbureter by the suction of the engine cylinder, so that it will be seen that heated air will be passed to the oil chamber of the carbureter whether the fan is in operation or not so long as the engine is running. If desired, the outlet of the fan may be connected directly to the end of the casing T so that the air will be first heated by contact with the engine cylinders and further heated by contact with the exhaust pipe as it is passed to the carbureter. To further facilitate the gasification of the oil in the carbureter, means are provided for heating the same and in the present embodiment of the invention, the exhaust of the engine is utilized for this purpose.

In the construction disclosed in the drawings, K designates a pipe which is coiled for a considerable portion of its length about the exterior of the exhaust pipe $B^2$ of the engine, and the ends of which communicate with the carbureter F, one end of said pipe communicating with the carbureter below the level of the liquid contained therein, and the other end of said pipe communicating with the carbureter, just above the level of the liquid contained therein. From this construction, it will be seen that the heat of the exhaust pipe will heat such oil as is contained in the coil K, and will cause a constant circulation of the oil in the carbureter through said coil, so that in a comparatively short time all of the oil in the carbureter will be heated.

Positioned in the upper portion of the carbureter F and extending transversely thereof, is a fine screen L, which may be formed either of cloth or of wire gauze, which breaks up the globules and acts as a condenser to remove all moisture from the gas when it passes therethrough, it being well known that a dry gas will allow of a much greater percentage of air in the mixture than a wet gas.

The engine supply pipe communicates with the carbureter F above the screen L, and such supply pipe has formed therein an air port M which communicates directly with the outer air and through which air is drawn in and mixed with the gas as the same passes to the engine through the supply pipe $B'$. The port M may be closed when desired by means of the valve $M'$, which is carried by a suitable valve arm $M^2$, pivotally supported in any suitable manner upon the side of the supply pipe $B'$. In starting the engine it is desirable to close the air port M and for this purpose a cable $M^3$ is provided which is connected to one end of a stem which extends downwardly from the valve M and projects through the pipe $B'$, and which extends forwardly to the front of the car, or where convenient, and terminates in an operating handle $M^4$, which is supported in any suitable manner at one side of the radiator $C'$, so as to be convenient to the operator when starting the engine. Positioned within the supply pipe $B'$ is also a gas valve throttle N, which may be of any desired construction and which enables the connection between the engine and carbureter to be closed or opened in the usual way by the lever S, when it is found desirable to do so. The gas throttle N and the air valve $M'$ are preferably constructed so that they may both be operated at the same time by the lever S through the gas valve and the arm $M^2$ and that the air valve $M'$ may be closed independently of the gas valve in starting the engine. To obtain this result the arm $M^2$ of the air valve is loosely mounted on the stem of the throttle valve N which projects outwardly beyond the side of the supply pipe $B'$, so as to be capable of a slight independent movement relative thereto, a pin and slot connection being conveniently provided for this purpose between the arm $M^2$ and the stem of the throttle valve N. Interposed between the arm $M^2$ and the stem of the throttle valve is a spring U which normally holds the arm $M^2$ in such a position on the stem of the throttle valve that when the throttle valve is moved from a closed to an open position, the air valve will, through the arm $M^2$, be also moved to an open position. By reason of the fact that the arm $M^2$ is capable of a slight independent movement on the stem of the throttle valve, the operator may, when the throttle valve is open, close the air valve by manipulating the handle $M^4$ heretofore referred to, so as to obtain a rich charge to facilitate starting. As soon as the handle is released the spring will restore the air valve to its normal position.

While a convenient embodiment of the invention is illustrated in the accompanying drawings, it will be understood that the invention is not limited to the particular form and construction therein shown, as many changes may be made to such form and construction without departing from the spirit and scope of the invention as defined in the appended claims.

It is usual in automobiles to place the gasolene tank in the position shown in the drawings herein, namely, transversely of the machine, and by placing the carbureter in such a tank there is gained the advantage of immediate supply and also by heating the air introduced into the carbureter or carbureting chamber in the tank the fluid of the tank is more or less tempered or heated, thus gaining the advantages gained in the usual type wherein the carbureter is positioned adjacent the engine. By locating the carbureter in the tank, it is well positioned to prevent what is now commonly known as back firing and at the same time it is sealed against the entrance of dust or cinders. One of the advantages of the distribution effected by the U-shaped pipes is that of equal distribution throughout the carbureting chamber of the heated air from the engine and by the construction shown a very rapid carburation of the air is effected in the carbureting chamber.

It is quite frequent in automobile service to have the fluid feed effected by the tilting or swaying of the car, thus varying more or less the amount of fluid allowed to enter the carbureter. By forming the float I elongated and positioning it near the bottom of the carbureting chamber, the same is rendered active for the purposes of maintaining the proper amount of fluid in the carbureting chamber irrespective of the tilting movement or sidewise tilt of the machine.

I claim:—

1. In a motor vehicle, the combination with an explosive engine, of an oil storage tank located in rear of the engine, a carbureting chamber positioned within said tank and extending transversely of the vehicle, means for supplying heated air from the engine to the carbureter, a valve for establishing communication between said storage tank and the carbureting chamber, an operating member for said valve, an elongated float positioned in the carbureting chamber and substantially co-extensive in length with the width of said carbureting chamber, and a pivotal connection between said float intermediate the ends thereof and said operating member, whereby the float is free to tilt in a plane transversely of the vehicle.

2. In a carbureter, a carbureting chamber, means for supplying air thereto comprising an air supply pipe provided with a plurality of oppositely disposed spaced branches, extending downwardly into the carbureting chamber, a liquid storage tank, a valve for establishing communication between said storage tank and said carbureting chamber, an operating member for said valve, an elongated float positioned in the carbureting chamber between the oppositely disposed branches of the air supply pipe, said branches serving to guide the float in its vertical movement, and a pivotal connection between the central portion of said float and said valve operating member whereby the float may tilt in the vertical plane of its major axis.

3. In a gas engine, the combination with an explosive engine, of a carbureter, means for supplying air to the carbureter, means for conducting the carbureted air from the carbureter to the engine, an exhaust pipe, and a conduit leading from the carbureting chamber to a point adjacent and in heating proximity to the exhaust and back into the carbureting chamber.

4. In a gas generator for motor vehicles, the combination with an engine, a casing for the engine, an exhaust pipe for the engine, a carbureter adapted to contain a supply of oil, a gas supply pipe leading from the carbureter to the engine, an air supply pipe leading to the carbureter below the oil level therein, a fan communicating with the inlet end of said supply pipe and adapted to draw air through the engine casing and into contact with the engine therein and force the same to the carbureter, and an air pipe surrounding the engine exhaust pipe and having its rear end connected to said air supply pipe and its front end open to the air.

In testimony whereof I affix my signature in presence of two witnesses.

SEYMOUR W. PEREGRINE.

Witnesses:
LENA B. DECELLE,
EDITH M. HINCKLEY.